Patented June 30, 1925.

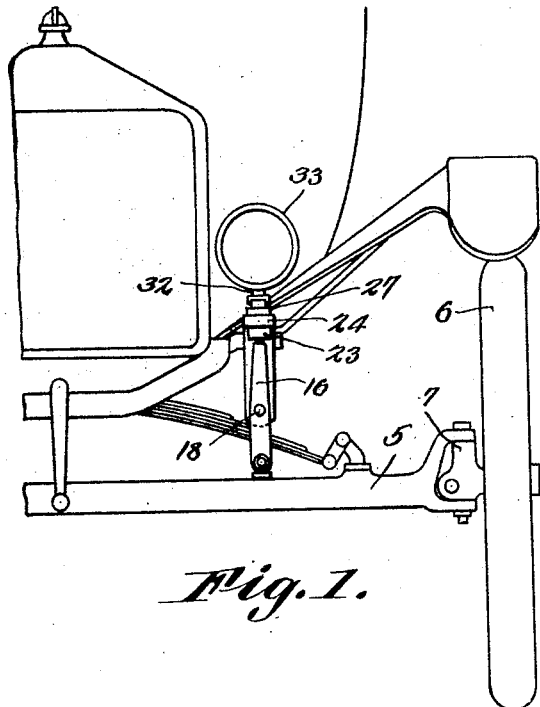
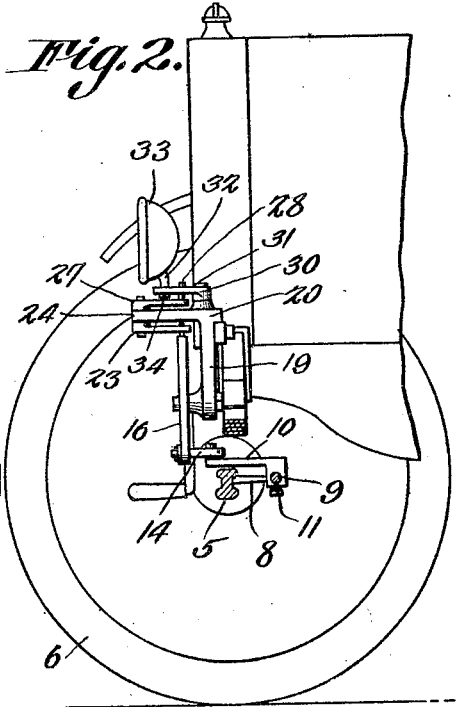
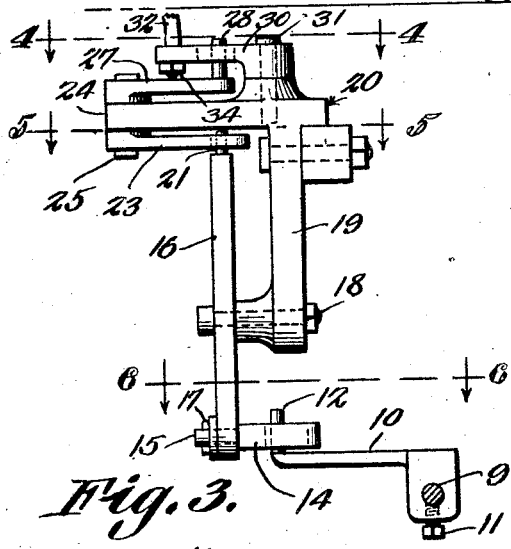
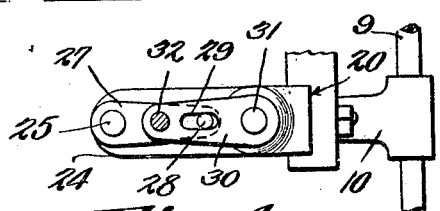
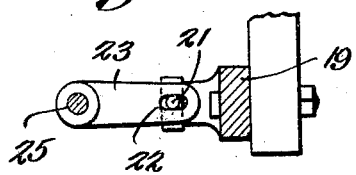
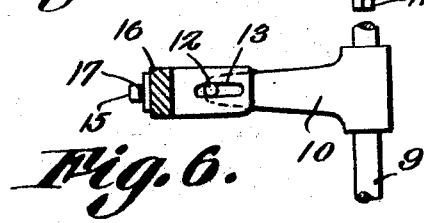

1,543,982

UNITED STATES PATENT OFFICE.

PETER BROWN, OF CHATTANOOGA, TENNESSEE, ASSIGNOR OF ONE-THIRD TO DREW A. LANDRESS, OF CHATTANOOGA, TENNESSEE.

REVERSIBLE AUTO LIGHT.

Application filed January 12, 1925. Serial No. 1,937.

*To all whom it may concern:*

Be it known that I, PETER BROWN, a citizen of the United States, residing at Chattanooga, in the county of Hamilton and State of Tennessee, have invented a new and useful Reversible Auto Light, of which the following is a specification.

This invention relates to headlights for motor vechicles, and more particularly to headlights of the dirigible type.

The primary object of the invention is to provide simple means which may be connected with the usual spindle arm connecting rod of a steering gear for causing the headlight to move when the front wheels of the vehicle are moved to guide the vehicle.

A further object of the invention is to provide a device of this character including comparatively few parts, and one which is exceptionally sensitive in operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a front elevational view of a lamp constructed in accordance with the invention.

Figure 2 is a side elevational view thereof.

Figure 3 is an enlarged elevational view of the operating device.

Figure 4 is a sectional view taken on line 4—4 of Figure 3.

Figure 5 is a sectional view taken on line 5—5 of Figure 3.

Figure 6 is a sectional view taken on line 6—6 of Figure 3.

Referring to the drawing in detail, the reference character 5 indicates the front axle of a motor vehicle on which the front wheels 6 are mounted, as by means of the spindles 7.

The reference character 8 indicates the usual spindle arms which have connection with the spindles 7 and extend rearwardly where they are connected as by means of the connecting rod 9.

Adjustably mounted on the rod 9 is an arm 10 which is provided with a set screw 11 for securing the arm in various positions of adjustment, and as shown, the arm 10 is provided with an upstanding end portion 12 that moves in the elongated opening 13 formed in the member 14.

This member 14 is provided with a reduced end portion 15 that passes through an opening formed in the lower end of the arm 16, where it is secured as by means of the pin 17. The arm 16 is pivotally supported on the bolt 18 that passes through the lower portion of the arm 19 forming a part of the bracket 20, the upper end of the arm 16 being reduced as at 21, where it is positioned in the elongated opening 22 of the arm 23.

Forming a part of the bracket member 20 is a horizontally disposed arm 24 that is provided with an opening to accommodate the bolt 25 that provides means for connecting the arms 23 and 27 respectively, to the bracket member.

The arm 27 is mounted on the bolt 25 to move therewith so that movement of the arm 23 transmitted to the bolt 25, will result in a movement of the arm 27. Secured to the arm 27 is an upstanding pin 28 that moves in the elongated opening 29 of the arm 30, the arm 30 constituting the lamp supporting arm, and is pivotally mounted by means of the pin 31.

At the outer end of the arm 30 is provided an opening to accommodate the rod 32 that is carried by the lamp 33, the rod being secured as by means of the nut 34.

From the foregoing it will be obvious that as the rod 9 is moved laterally, a corresponding movement is transmitted to the arm 10, which operates to swing the lower end of the arm 16 in one direction, while the upper end of the arm 16 moves in the opposite direction to the end that the arms 23 and 27 are also operated moving the lamp in a horizontal plane with the result that the road surface directly in front of the vehicle is illuminated when the vehicle is making a turn.

I claim:—

1. A dirigible headlight including an arm adapted for connection with the spindle arm connecting rod of a vehicle, a vertical arm pivotally supported intermediate its ends, a member connected with the lower end of the vertical arm and having an elongated opening, the first mentioned arm having an upstanding end portion fitted in the elongated opening, an arm mounted above the vertical arm and adapted to support a lamp for movement in a horizontal plane, and means for transmitting movement from the upper end of the vertical arm to the last mentioned arm.

2. A dirigible headlight including an arm adapted to be adjustably mounted on the spindle connecting rod of a motor vehicle, said arm having an upstanding end portion, a vertical arm pivotally mounted adjacent to the first mentioned arm, a member carried by the first mentioned arm having an opening to accommodate the upstanding end portion, said upstanding end portion adapted to permit of vertical movement of the vertical arm with respect to the first mentioned arm, means for pivotally supporting the vertical arm intermediate its ends, a lamp supporting arm mounted above the vertical arm, said lamp supporting arm having an elongated opening, an arm having an upstanding pin mounted in the elongated opening of the lamp supporting arm, and means for transmitting movement of the vertical arm to the last mentioned arm.

In testimony that I claim the foregoing as my own, I have hereto affixed my signature in the presence of two witnesses.

PETER BROWN.

Witnesses:
  E. R. DAVIS,
  CHAS. CROWE.